UNITED STATES PATENT OFFICE.

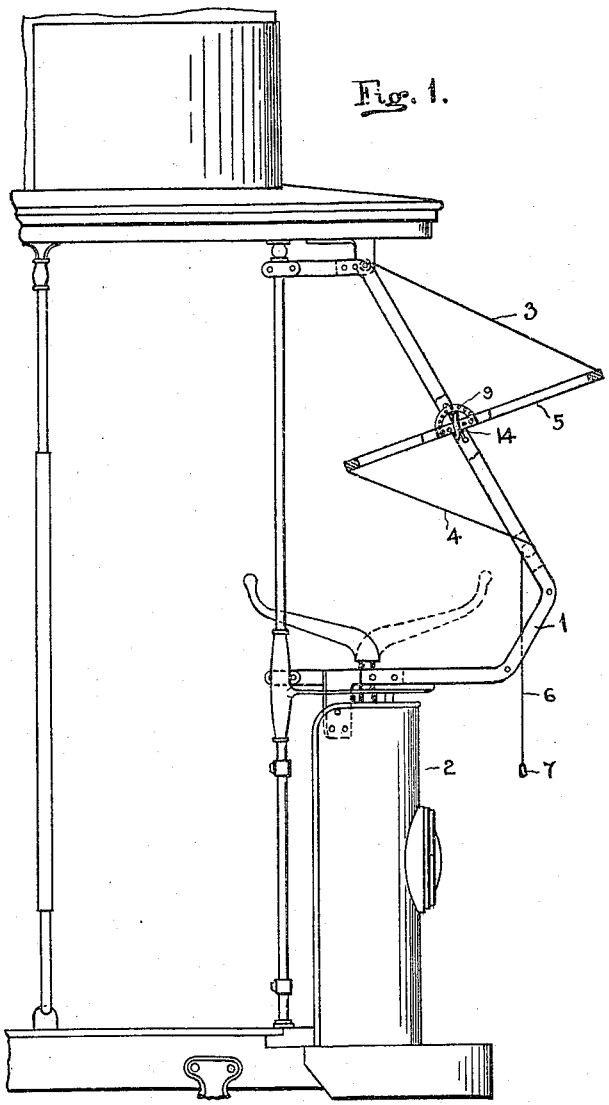

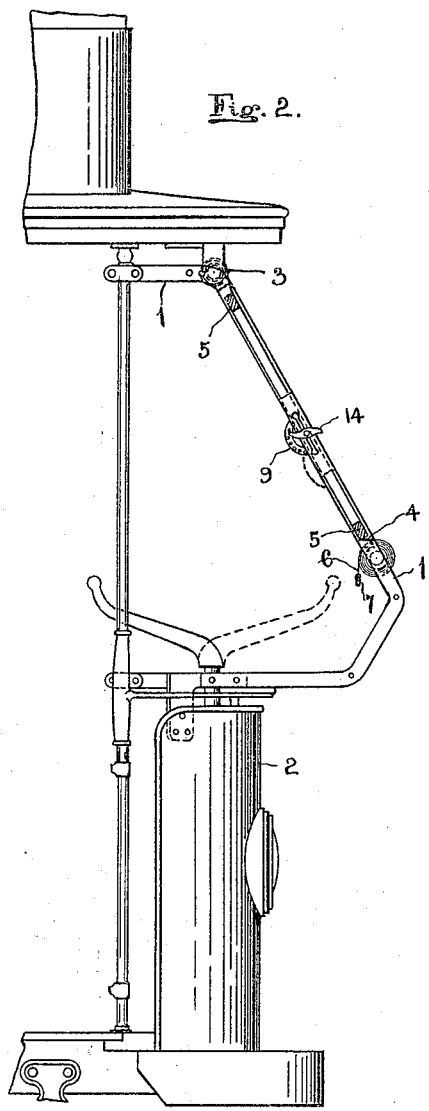

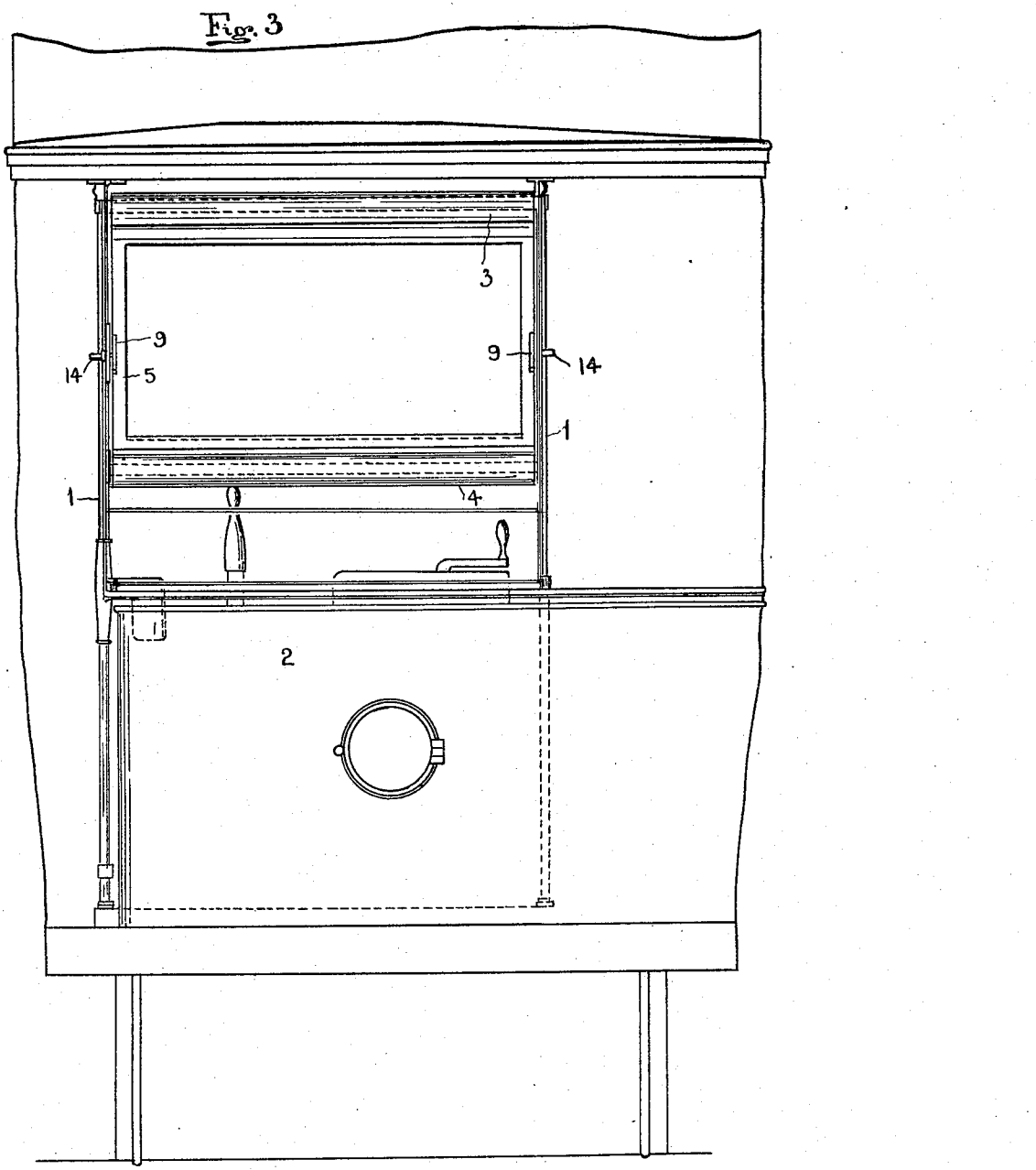

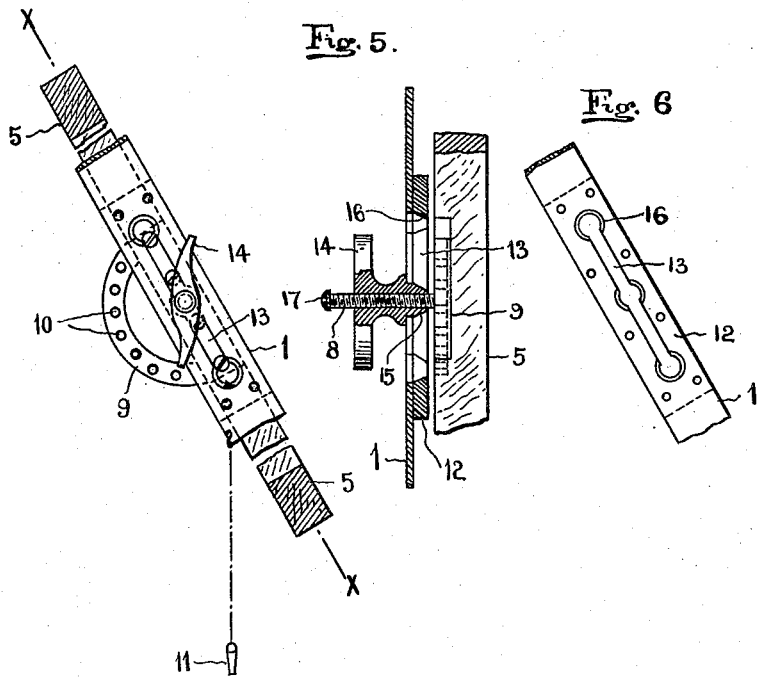

THOMAS C. AVELING, OF BIRMINGHAM, ENGLAND.

WEATHER-SCREEN FOR VEHICLES.

1,169,911.  Specification of Letters Patent.  Patented Feb. 1, 1916.

Application filed January 5, 1915. Serial No. 609.

*To all whom it may concern:*

Be it known that I, THOMAS CLIFFORD AVELING, subject of the King of Great Britain, residing at 91 New Canal street, Birmingham, in the county of Warwick, England, have invented a new and useful Improvement in Weather-Screens for Vehicles; and I do hereby declare the following to be a full, clear, and exact description of the same.

This invention relates to improvements in weather screens for motor and other vehicles and is particularly applicable to commercial motor wagons, motor omnibuses, tram cars or the like.

The object of the present invention is to effectively screen the driver from the elements.

The invention comprises the combination and arrangement of three spring roller blinds with a fixed frame and a swinging frame so that a variety of settings of the blinds forming the weather screen is possible, and in the means of carrying and locking the said blinds and swinging frame in the desired position. The lower of the three blinds is arranged in such a manner that the lower part of the body of the driver, more particularly the legs, are protected by this blind forming the equivalent of an apron and moreover the said blind insures a simple but effective weather joint between the bottom roller and the front of the vehicle.

In operation when the swinging frame is moved about its pivots to withdraw the blinds from their rollers two of the blinds move at a constantly varying angle to the two frames to which they are connected, while the third or lower blind falls vertically under the influence of a weighted strip, bar, or the like, and when the three blinds are in the desired position they are secured by means of a sliding projection or pin which engages in one or other of a series of holes formed in a quadrant, said quadrant being attached to the sliding frame. The swinging frame is pivotally mounted and fixed in the desired position as will be hereinafter described.

In the drawings:—Figure 1 is a side elevation partly in section of my weather screen attached to a tram car, the screen being in its open position. Fig. 2 is a similar view to Fig. 1, but illustrating the screen in its closed position. Fig. 3 is a front view of Fig. 2. Fig. 4 illustrates on an enlarged scale the means for retaining the swinging frame in position. Fig. 5 is a sectional elevation on line X—X of Fig. 4, and Fig. 6 shows part of the fixed frame seen in Fig. 4 separated from the swinging frame and locking means.

A fixed frame 1 is firmly secured to the front of the vehicle 2, and mounted in the said frame are two spring roller blinds 3 and 4, the free end of the blind 3 being connected to the top of a swinging frame 5 and the free end of the blind 4 being connected to the bottom of the swinging frame 5. The third or lower spring roller blind 6 winds with and on the roller of the blind 4, the blind 6 being provided with a weighted bar 7 to maintain it in its lowered position. The swinging frame 5 is pivotally mounted in the fixed frame 1 by means of the screwed pins 8 on either side, and locked in the determined position as will be hereinafter fully described.

When the swinging frame 5 is adjusted to the desired position, the blind 6 automatically unwinds and falls vertically from the roller on the lower blind 4, forming a cover for the lower part of the driver's body or legs, and also forming a weather joint at the bottom of the blind 4 between this blind and the front of the vehicle 2.

The means for adjustably securing and maintaining the swinging frame in the desired position are illustrated more particularly in Figs. 4–6, the swinging frame 5 being provided with a quadrant 9 having holes 10 therein to receive a pin 11 attached to the fixed frame 1. The pin 11 is adapted to engage in one of the holes 10 in the quadrant 9 when the swinging frame 5 has been set in its desired angular relation to the fixed frame 1, the periphery of the pin 11 bearing against one side of the fixed frame 1 and thereby maintaining the desired angular setting of the swinging frame 5. The fixed frame 1 is provided with a plate 12 having a slot 13 therein which permits of three longitudinal adjustments in the relative positions of the frame 1 to the frame 5 by means of the fly-nut 14 provided with a coned shank 15 which fits into the countersunk holes 16 of the slot 13 in the plate 12.

The swinging frame 5 provided with screwed pins 8 secured thereto, upon one or both of which the fly-nut 14 screws, the said pin serves to prevent the nut from being lost or misplaced, as the head 17 of the pin 8 prevents the nut from being unscrewed too far, while allowing sufficient movement for the coned shank of the nut to move out of engagement with the countersunk holes 16 in the plate 12, when longitudinal adjustment of the relative position of the two frames is required.

If longitudinal adjustment of the swinging frame is necessary the fly-nut 14 is loosened and the frame 5 raised or lowered in relation to the fixed frame 1 and then again secured by tightening up the nut 14 in one of the countersunk holes 16.

The present invention forms a complete effective and simple weather screen for use particularly in combination with commercial motor wagons, motor omnibuses, tram cars or the like, and is readily adaptable to such vehicles without any material alteration of the vehicle.

What I claim is:—

1. A weather screen for vehicles having in combination, two spring roller blinds mounted on a frame fixed to the vehicle, a swinging frame pivotally mounted in the said frame, said blinds being connected to the top and bottom respectively of the swinging frame, a third blind mounted on the roller of one of said blinds and automatically operable therewith to form a weather joint between the said roller and the front of the vehicle and also to form an apron, and means for adjustably fixing the position of the swinging frame.

2. A weather screen for vehicles having in combination, two spring roller blinds mounted on a frame fixed to the vehicle, a swinging frame pivotally and longitudinally adjustably mounted in the said frame, said blinds being connected to the top and bottom respectively of the swinging frame, a third blind mounted on the roller of one of said blinds and automatically operable therewith to form a weather joint between the said roller and the front of the vehicle and also to form an apron, and means for adjustably fixing the angular and longitudinal position of the swinging frame.

3. A weather screen for vehicles having in combination, two spring roller blinds mounted on a frame fixed to the vehicle, a swinging frame pivotally mounted in the said frame, said blinds being connected to the top and bottom respectively of the swinging frame, a third blind mounted on the roller of one of said blinds and automatically operable therewith to form a weather joint between the said roller and the front of the vehicle and also to form an apron, and means comprising a quadrant fixed to the swinging frame, a pin coöperating with said quadrant to fix the position of the swinging frame, and a fly-nut for securing the two frames in relation to each other.

4. A weather screen for vehicles having in combination, two spring roller blinds mounted on a frame fixed to the vehicle, a swinging frame pivotally and longitudinally adjustably mounted in the said frame, said blinds being connected to the top and bottom respectively of the swinging frame, a third blind mounted on the roller of one of said blinds and automatically operable therewith to form a weather joint between the said roller and the front of the vehicle and also to form an apron, means for adjustably fixing the angular position of the swinging frame, and a slotted plate mounted on the fixed frame and provided with countersunk holes, a fly-nut having a coned shank adapted to engage in said holes to permit of longitudinal adjustment of the swinging frame in relation to the fixed frame.

In testimony whereof, I have signed my name to this specification in the presence of two subscribing witnesses.

THOMAS C. AVELING.

Witnesses:
 NORMAN S. BARLOW,
 GEORGE E. FOLKES.

Copies of this patent may be obtained for five cents each, by addressing the "Commissioner of Patents, Washington, D. C."